United States Patent [19]

Basso et al.

[11] Patent Number: 5,694,714

[45] Date of Patent: Dec. 9, 1997

[54] INSECT LIKE FISH LURE WITH WING STRUCTURE THAT CAN OSCILLATE TO SIMULATE INSECT ACTIVITY

[75] Inventors: Paul T. Basso, 341 Vincent Ave., Lynbrook, N.Y. 11563; Frank Cavuoto, Huntington Station, N.Y.

[73] Assignee: Paul T. Basso, Lynbrook, N.Y.

[21] Appl. No.: 610,248

[22] Filed: Mar. 4, 1996

[51] Int. Cl.⁶ .................................................. A01K 85/00
[52] U.S. Cl. ........................................ 43/26.2; 43/42.27
[58] Field of Search ......................... 43/26.1, 26.2, 43/42.26, 42.27, 42.3; 446/35, 356, 353

[56] References Cited

U.S. PATENT DOCUMENTS

| | | | |
|---|---|---|---|
| 1,068,908 | 7/1913 | Lane | 43/26.2 |
| 2,952,935 | 9/1960 | Jordan | 43/26.2 |
| 4,536,985 | 8/1985 | Caviness | 43/26.2 |
| 5,035,075 | 7/1991 | Pearce | 43/42.3 |
| 5,105,573 | 4/1992 | Mays | 43/26.2 |

FOREIGN PATENT DOCUMENTS 445186  2/1968  Switzerland ........................ 43/26.2

*Primary Examiner*—Jeanne Elpel
*Attorney, Agent, or Firm*—George J. Brandt, Jr.

[57] ABSTRACT

A fish lure is made in simulation of an insect and has a torso carrying wings, the wings being intermittently oscillated by a drive unit carried in the torso so that this simulates the activity of a living insect and therefore is more enticing to a fish as representing a live insect potential food object.

10 Claims, 3 Drawing Sheets

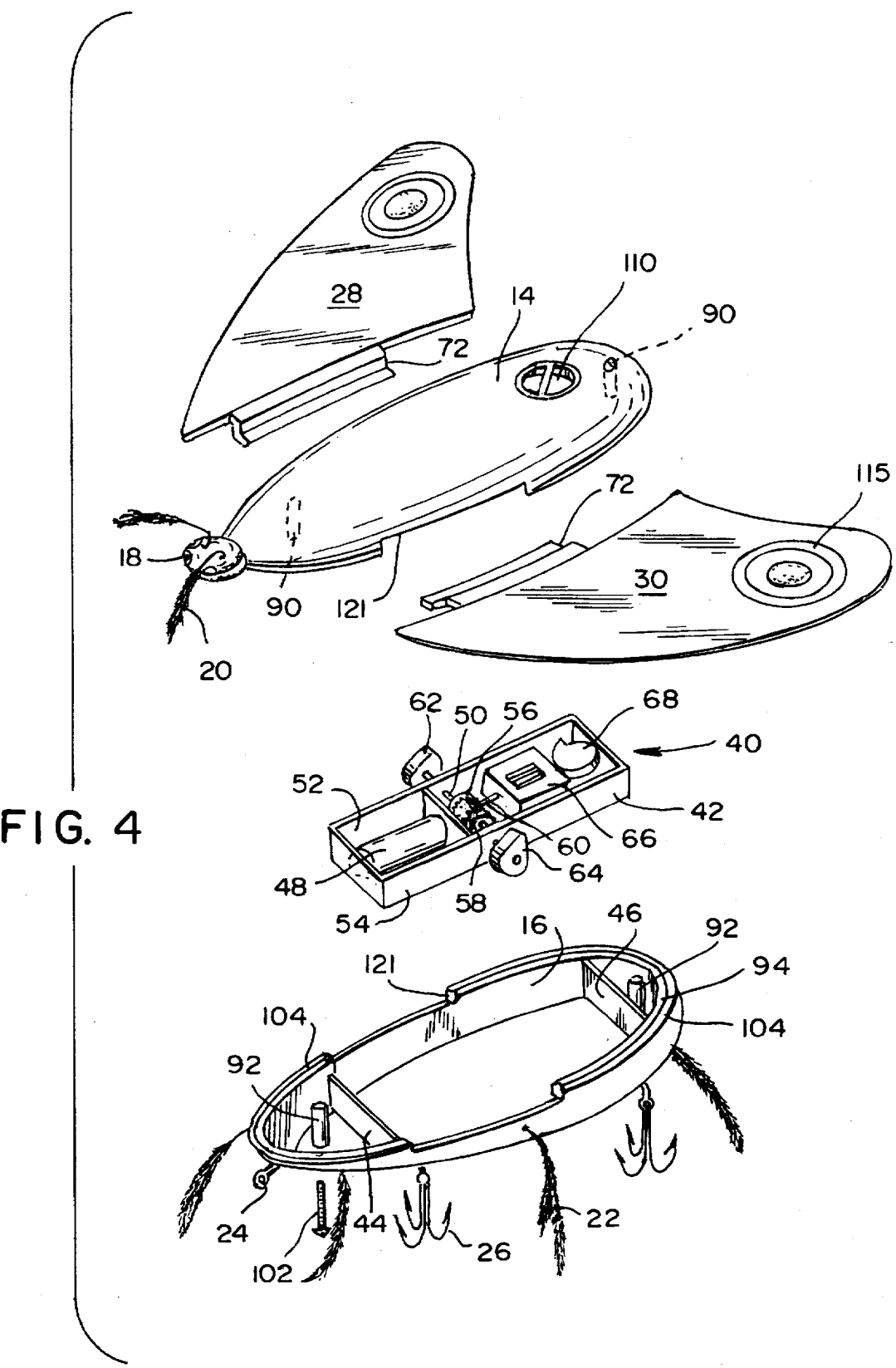

INSECT LIKE FISH LURE WITH WING STRUCTURE THAT CAN OSCILLATE TO SIMULATE INSECT ACTIVITY

BACKGROUND OF THE INVENTION

The present invention relates to a fish lure and, more particularly, to a fish lure configured and operable in semblance to a living insect.

Many forms of fish lures are known, these being generally designed with a view to the particular type of fishing in which the fisherman will be involved. In the case of stream and pond fly fishing, lures are used which mimic certain types of insects at least as to appearance. Commonly, insects will alight on the surface of a pool or stream and the presence of an insect will attract a fish seeking food.

While a variety of insect simulative lure constructions are used, they have a common drawback in that they are inanimate objects. A living insect on a water surface will exude some manifestation of life to the fish. For example, an insect will intermittently flex its wings and this activity heightens the attraction given the fish.

It is desirable that a fish lure be provided which in both appearance and constructional character manifests to fish attributes of a living insect.

OBJECTS AND SUMMARY OF THE INVENTION

An object of the invention to provide a fish lure which is fashioned in the form of an insect and which embodies constructional features for producing activity duplicative of that given by living insects.

Another object of the invention to provide a fish lure in the shape of an insect which has wings which move in the manner of living insect wing movement.

A further object of the invention is to provide a fish lure which simulates living insect activity on intermittent basis in the way exercised by living insect at a water surface.

A still further object is to provide a fish lure the construction of which is readily embodied in a simulative insect form of a variety of insect types inclusive of a moth, a cicada etc.

In accordance with the invention, the fish lure includes a torso simulative of that of, for example, a moth, the torso which can be made in sections, being a hollow structure advantageously made of hard plastic and being fitted with seal means so that with the wing structure attached thereto, the torso is a watertight component. A pair of wings extend laterally from opposite sides of the torso and these wings are mounted to the torso in such manner as to be movable relative to the torso in up and down flexing movements or oscillations.

Movement of the wings is produced with power operated structure carried in the torso housing, this structure including a battery power source driving a motor which in turn rotates a pinion that meshes with two facing gears, these gears being fixed, e.g., on a common shaft with rotary cams located at opposite ends of the shaft that engage with wing ends that extend into the torso. As the cams rotate, they oscillate the wings.

The power operated structure includes a bistable-multivibrator that controls motor operation to be intermittent in fashion as occurs with a living insect which does not constantly flex its wings while sitting on the water surface.

Other structure and object appearance simulative of an insect will be provided on the torso, this including feet, feelers, coloration pattern etc. Additionally one or more fish hooks will be carried on the torso such as at the underside.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 4 is an exploded perspective view of the fish lure showing the several parts of which it can be constituted;

DETAILED DESCRIPTION OF THE PREFERRED EMBODIMENT

The fish lure of the present invention is intended to provide a device which is as simulative as possible of a live insect thereby to heighten the success the fisherman will encounter when using same inasmuch as the fish lure not only presents appearance character of an insect, but it also is an animate device which duplicates live insect activity. The fish lure can follow appearance of any one of a number of insects but for convenience, is described below in terms of a moth. It will be understood that the insect geometry involved will be duplicated as to a living insect in terms of shape, proportion of wings to torso or body etc for the selected insect.

Figure 1:
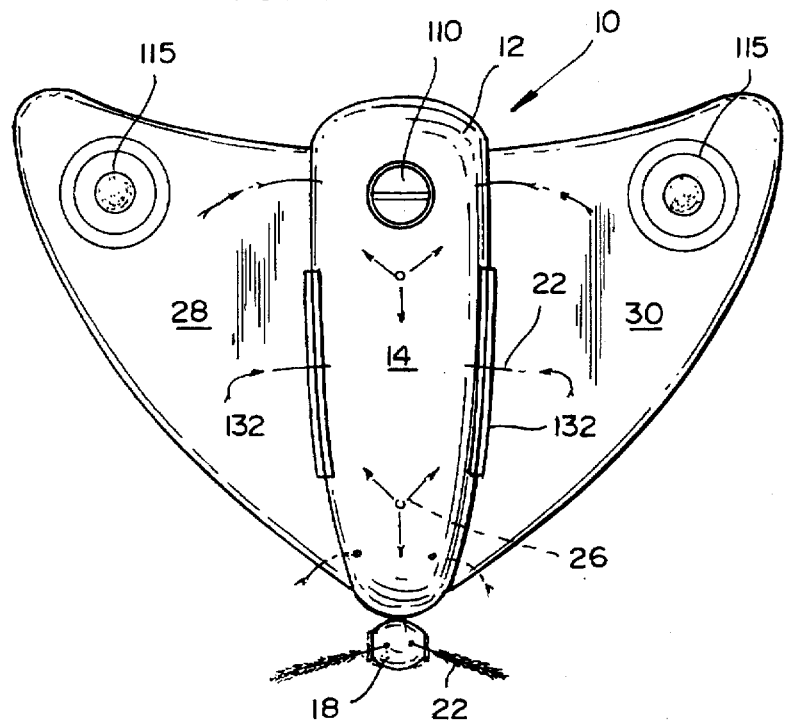
FIG. 1 is a top plan view of a fish lure constructed in accordance with the principles of the invention.
Figure 2:
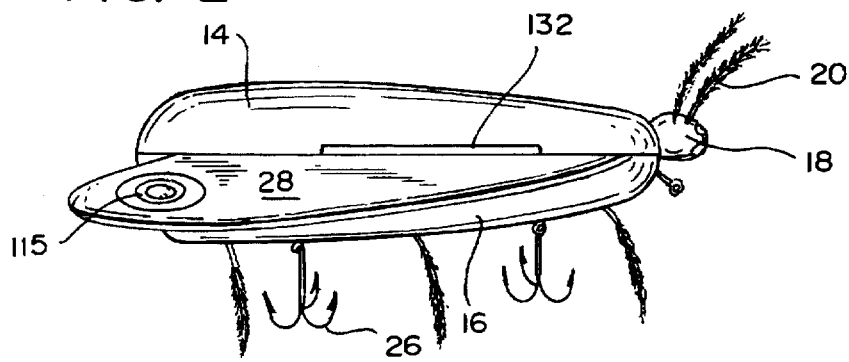
FIG. 2 is a right side elevational view of the fish lure.
Figure 3:
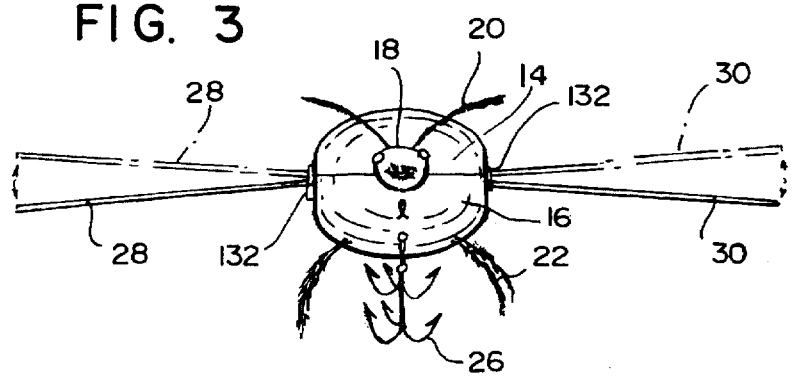
FIG. 3 is a front end elevational view of the fish lure.

Referring now to FIGS. 1-3, the fish lure 10 includes a hollow interior torso 12 comprised of upper and lower torso sections 14, 16, these being connected together in manner and by means as will be described latter with reference to FIG. 4, the torso being made of molded, hard plastic components. The torso 12 is in semblance of a moth, provided with a head 18, feeler 20 and legs 22, these appendages, for example, being of molded rubber and secured to the torso in any of a number of ways, adhesive securement being one. An eye 24 can be provided on the torso 12 below the head, this being where the fishing line can be secured. Also, one or more fish hooks 26 can be carried on the torso.

The torso carries wings 28, 30 which extend laterally therefrom and are so mounted as to be moveable relative to the torso. One manner of effecting this mounting will be detailed later and with reference to FIG. 5. Movement of the wings 28, 30 is effected to simulate activity of a living moth. This will involve oscillating or flexing the wings to the extent shown in FIG. 3 wherein wings will move back and forth between the solid line and phantom line positions depicted. This flexing will be intermittent and controlled with wing moving means as will be described shortly. It is to be understood that the wing movement in addition to having its own fish attractive purpose, will cause creation of water disturbance in the form of outwardly growing circles in the water which adds to the fish inducement purpose intended. Also, wing movement can emit sound waves, a further lure effect.

Referring to FIG. 4, it is seen that a power drive means package 40 is provided for reception interiorly of the torso and serves to flex or oscillate the wings 28, 30. The package 40 includes a case 42 which fits between torso lower section bulkheads 44, 46 and carries the components to be described now.

A power supply source or battery 48 locates at one end of the case. Adjacent the battery 48 and mounted on a common shaft 50 rotatable in case walls 52, 54 are a pair of face gears 56, 58 presenting facing gear teeth which are in mesh with a drive pinion 60. Mounted on opposite ends of shaft 50 are rotary cams 62, 64, these being, for example, heart-shaped cams. Pinion 60 is carried on the output shaft of electric motor 66 and situated adjacent the motor is a bistable-multivibrator 68.

The cams 62, 64 when rotated by the drive motor 66 engage end parts 72 of the wings, which end parts extend into the torso interior. Contact of the high points of the cams with the wing end parts causes upward flexing of the wings, with the passing of the high points from that contact, the resilient mounting of the wings to the torso and gravity effect results in downward flexing. This flexing cycles as long as the motor is driving the shaft 50.

In keeping with the reality that an insect will not constantly flex its wings when it is sitting on a water surface, operation of the wings, that is, flexing, will be on an intermittent basis of flexing cycles of say 10 seconds flexing—10 seconds rest. To produce this effect, bistable-multivibrator 68 is employed. This is done in such manner that the bistable-multivibrator will allow battery power supply to the motor for 10 seconds. Then the bistable-multivibrator will switch to a mode that results in interruption of power to the motor. This cycling will repeat itself for the stated periods and so on. Other cycle time periods can be used depending on the bistable-multivibrator characteristics selected and this can be based on the practice of the living insect being simulated.

Figure 5:
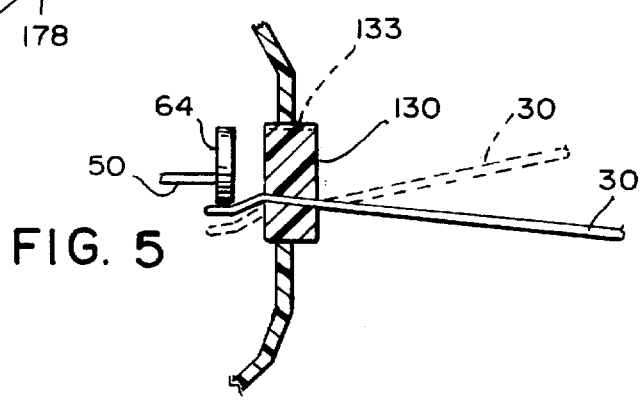
FIG. 5 is a vertical fragmentary sectional view on enlarged scale depicting one manner in which the wings can be connected to the torso to permit flexing of the wings relative to the torso while retaining water tight integrity in the lure structure.

FIG. 5 depicts a manner with which the wings 28, 30 can be movably mounted to the torso 12. The torso it is seen is slotted as at 121 in both its upper and lower sections to accommodate pass through of the wing extension parts 72. These slots 121 define a rectangular opening in the torso and in addition to movably mounting the wings for flexing, the mounting means described next will serve to block or tightly seal that opening.

A gasket 130 of flexible, water impervious water encircles the extension parts 72 and is configured such as to have a width expanse to extend a distance inward of the opening defined by slots 121 and to extend a distance outwardly of the opening along the length expanse of the wings. This outward gasket projection is seen at 132 in FIGS. 1 and 3.

The gasket will be pierced or otherwise provided with means to allow the wing extension and short adjacent wing length part to be received therein. The arrangement further will be such that by adhesive means or the like the pass through of the extensions and wing will present a water tight barrier. When the torso sections are assembled with the wings set in place, the gasket will be positioned to fill the torso opening and with tightening of the sections together, the gasket will compress as at 133 to seal the long sides of the torso opening and additionally, the gasket will elongate slightly at the vertical ends and therewith be pressed sealingly against the short ends of the edge structure defining this opening.

The flexible nature of the gasket material as well as the manner of reception of the wing therein provides a joint structure allowing flexing of the wing.

FIG. 5 also depicts the cam-wing extension engagement, the wing solid line positioning showing where the cam low point is engaged, whereas, the dashed line moved wing position is illustrative of the cam high point engagement.

Referring again to FIG. 4, the torso sections 14, 16 can be connected together in water tight condition in a number of ways. Illustrative of one such is depicted wherein it is seen the upper torso section has internal posts 90 at each end and over which tubular posts 92 in the lower section will be received with assembly of the sections. Screws such as shown at 102 then can be passed into the post tube arrangement and into engagement with threads in the posts 90 to tighten the sections together. Where the torso sections have abutment with each other along edges as at 104, a slot/O-ring seal 94 arrangement can be provided to insure water tightness of the torso.

An off-on switch 110 controlling enabling of electrical components in the torso can be provided at any convenient location on the torso, for example, on the upper rear torso back.

In appearance, the torso 12 and wings 28, 30 can be colored appropriate to the insect being simulated or otherwise. Bright insect alluring colors may be used and specific attractive indicia such as the rondelles 115 (FIG. 4) can be used.

Figure 6:
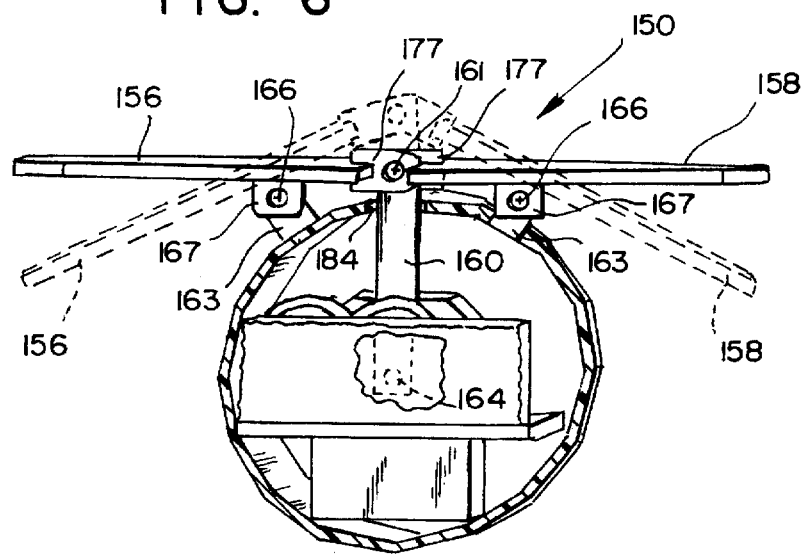
FIG. 6 is a transverse, vertical sectional view of another embodiment of the fish lure in which the wings are mounted wholly exteriorly of the torso, the wings being driven in flexing movement with an eccentric drive carried in the torso.
Figure 7:
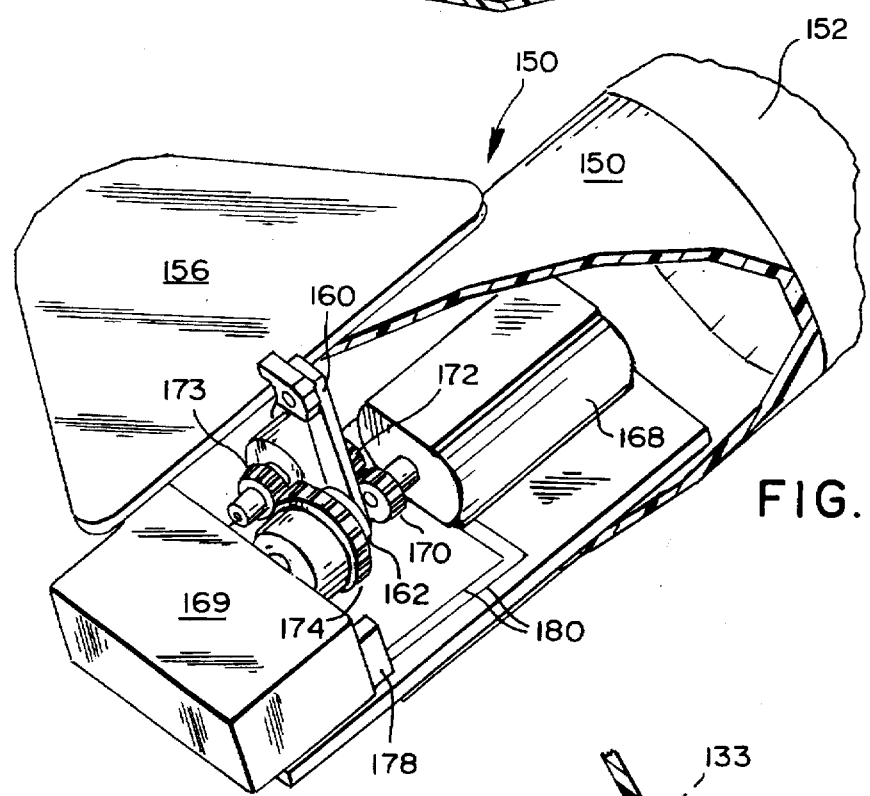
FIG. 7 is a fragmentary perspective view of the FIG. 6 embodiment with a portion of the torso structure broken away to show drive means details in the torso, and with only one of the wings being depicted.

FIGS. 6 and 7 depict another embodiment 150 of the fish lure in which the torso is comprised of a cylindrical body 152 having a nose piece 154 fitted thereto and a tailpiece (not shown) closing the rear end of the body 152, this providing a watertight torso structure. Wings 156, 158 are mounted exteriorly of the torso and above same a slight distance. The wings 156, 158 are articulated at common or inner ends of each to the top end of an actuator rod 160 extending upwardly from the torso, this being with a pin 161. The wings also are mounted to external pivot supports 163 on the torso at locations intermediate the inner and outer ends of the wings, the wings having brackets 167 receptive of pivots 166, the pivots also being received in the pivot supports.

The actuator rod 160 is pivoted at a lower end to a crank pin 164 (FIG. 6) carried on an eccentric 162 located in the torso. In the FIGS. 6 and 7 showing, the eccentric crank pin is at low point and in correspondence to that the wings 156, 158 are horizontal as shown in solid lines. When the eccentric 162 rotates, rod 160 moves up to bring pin 164 to a high point and the wings will be pivoted on fixed pivots to the dashed line position, this indicating the oscillating movement range of the wings, continued eccentric rotation back to the low point bringing the wings back to horizontal. It is also possible to use a cam instead of the eccentric for producing wing movement.

As can be seen particularly in FIG. 7, drive means are torso mounted and include a battery power source 169 powering a drive motor 168, the motor having an output pinion 170, engaged with a gear train 172–174, the front face of gear 174 carrying the eccentric 162. A control unit 178 is connected via leads as at 180 to the motor and is used to control intermittent operation of the motor. Control function can be effected in various ways. For example a timing chip such as a Radio Shack 556 Dual Timer timing chip can be used for that purpose. Additionally, the control unit can be used to reduce or step down motor speed thereby to lessen the gear reduction ratio needed for the gear train.

Wing grips 177 are mounted rotatably on pin 161 and these gird and grip inner edge parts of the wings to transmit the actuator rod motion to the wings to pivot same. The torso is slotted as at 184 at the top thereof for pass through of the actuator rod. This slot and the actuator rod can be enclosed with a bellows type boot or rubber seal unit to prevent egress of water into the torso interior.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A fish lure fashioned to present the semblance of a living insect, said fish lure comprising a torso, wing structure carried on the torso and extending laterally thereof at opposite sides of the torso, the wing structure having parts extending interiorly of the torso, drive means including a rotary element carried in the torso, said rotary element being engagable with the wing structure parts extending interiorly of the torso for oscillating the wing structure to simulate activity of a living insect, there being power operated means including a drive motor and a power source for driving the rotary element, and means for intermittently controlling the operation of the drive motor, the drive motor intermittent control means comprising a bistable multi-vibrator connected with said motor and said power source.

2. A fish lure fashioned to present the semblance of a living insect, said fish lure comprising a torso, wing structure carried on the torso and extending laterally thereof at opposite sides of the torso, the wing structure being carried by the torso such as to be movable relative thereto, drive means carried in the torso and engagable with the wing structure for oscillating the wing structure to simulate activity of a living insect, power means operating the drive means, and means for intermittently interrupting the operation of the power means, the interrupting means comprising a bistable multi-vibrator connected with the power means.

3. A fish lure fashioned to present the semblance of a living insect, said fish lure comprising a torso having upper and lower sections enclosing a space defining a torso interior, a pair of wings extending one each from opposite sides of said torso, said wings being carried by said torso so as to be movable with respect to said torso, said wings having portions which extend into said torso interior, and means carried in said torso interior engagable with said wing portions and operable to oscillate said wings to simulate activity of a living insect, said oscillating means including rotary cams, a pinion gear and gears in mesh therewith connected to the rotary cams, the pinion gear being driven by an electric drive motor, and a power source carried in the torso operating said drive motor, there being means for intermittently controlling power supply from the power source to the motor.

4. The fish lure of claim 3 in which the torso sections are removably connectable together, said torso sections each having edges which abut with edges of another section, there being seal means intervening the torso sections where the edges of said torso sections abut.

5. The fish lure of claim 4 in which the seal means is effective with the torso sections connected together to make the torso structure water tight where said sections abut.

6. The fish lure of claim 3 further comprising at least one fish hook carried on the torso.

7. A fish lure fashioned to present the semblance of a living insect, said fish lure comprising a torso, wing structure carried on the torso and extending laterally thereof at opposite sides of the torso, the wing structure being carried by the torso such as to be movable relative thereto, and drive means carried in the torso and engagable with the wing structure for oscillating the wing structure to simulate activity of a living insect, the wing structure comprising a pair of wings disposed above the torso and articulated at a common end of each to an end of an actuator rod extending upwardly from the drive means, opposite ends of the wings extending a distance beyond a respective one of the torso sides, each wing being supported intermediate the ends thereof on a pivot fixed at an upper exterior surface of the torso, an opposite end of the actuator rod being pivoted to a drive means rotary eccentric, the actuator rod moving up and down responsive to rotation of the rotary eccentric, up and down movement of the actuator rod oscillating the wings on the fixed pivots.

8. The fish lure of claim 7 further comprising power means for operating the drive means, the power means including a drive motor and a power source for operating the motor.

9. The fish lure of claim 8 further including means for intermittently interrupting power source operation of the motor.

10. The fish lure of claim 9 in which the interrupting means includes a control unit operable to interdict power from the source to the motor.

* * * * *